US012555513B1

(12) United States Patent
Chen et al.

(10) Patent No.: US 12,555,513 B1
(45) Date of Patent: Feb. 17, 2026

(54) TIMING CONTROLLER AND OPERATION METHOD THEREOF

(71) Applicant: Novatek Microelectronics Corp., Hsinchu (TW)

(72) Inventors: Yong-Jhih Chen, Hsinchu County (TW); Kuo-Chang Su, Hsinchu County (TW); Ren-Hong Luo, Hsinchu (TW); Zheng-Long Wu, Taoyuan (TW); Hao-Che Hsu, Kaohsiung (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 19/076,955

(22) Filed: Mar. 11, 2025

Related U.S. Application Data

(60) Provisional application No. 63/704,029, filed on Oct. 7, 2024.

(30) Foreign Application Priority Data

Jan. 15, 2025 (TW) ................................ 114101625

(51) Int. Cl.
*G09G 3/20* (2006.01)

(52) U.S. Cl.
CPC ....... *G09G 3/2096* (2013.01); *G09G 2310/08* (2013.01)

(58) Field of Classification Search
CPC .... G09G 3/2096; G09G 2310/08; G09G 3/20; G09G 3/22; G09G 3/24; G09G 3/26; G09G 3/00
See application file for complete search history.

(56) References Cited

U.S. PATENT DOCUMENTS

2007/0159440 A1* 7/2007 Kang .................. G09G 3/3685 345/99
2017/0039981 A1* 2/2017 Hwang ................ G09G 3/3611
2017/0162166 A1* 6/2017 Kang .................. G09G 3/3688
2023/0206824 A1* 6/2023 Go ...................... G09G 3/2077 345/691

* cited by examiner

*Primary Examiner* — Pegeman Karimi
(74) *Attorney, Agent, or Firm* — JCIPRNET

(57) ABSTRACT

A timing controller and an operation method of the timing controller are provided. The timing controller includes a timing signal generation part and a frame signal generation part. The timing signal generation part generates a clock signal to a plurality of source drivers for driving a display panel. The frame signal generation part generates a frame signal synchronized with the clock signal. The frame signal includes a plurality of data segments corresponding to different source drivers. The timing controller adjusts a phase of at least one of the clock signal and the frame signal, so that the clock signal has different timing skews for different data segments and is adapted to different transmission path delays between the timing controller and the source drivers.

23 Claims, 14 Drawing Sheets

TIMING CONTROLLER AND OPERATION METHOD THEREOF

CROSS-REFERENCE TO RELATED APPLICATION

This application claims the priority benefit of U.S. provisional application Ser. No. 63/704,029, filed on Oct. 7, 2024, and Taiwan application serial no. 114101625, filed on Jan. 15, 2025. The entirety of each of the above-mentioned patent applications is hereby incorporated by reference herein and made a part of this specification.

BACKGROUND

Technical Field

The disclosure relates to a display device and particularly relates to a timing controller and an operation method thereof.

Description of Related Art

A multi-drop architecture is widely applied in various electronic devices. For instance, a data transmission interface between different integrated circuits in a display device can be a low-voltage differential signaling (LVDS) interface or a mini low-voltage differential signaling (mini-LVDS) interface. The mini-LVDS is an example of the multi-drop architecture. This multi-drop architecture refers to a plurality of source drivers receiving signals from a timing controller (TCON) through the same transmission path (e.g., a clock signal transmission path and a frame signal transmission path). The timing controller provides a clock signal to the source drivers through the same clock signal transmission path. Similarly, the timing controller delivers a data signal to the source drivers through the same frame signal transmission path. Each source driver latches data of the frame signal based on a phase of the clock signal. Therefore, the phase relationship (timing skew) between the clock signal and the frame signal affects the accuracy of the latched data.

In actual applications of the multi-drop architecture, the clock signal transmission path and the frame signal transmission path often exhibit different transmission path delays. Due to these differences, various source drivers receive the clock signal and the frame signal with different timing skews. For instance, it is assumed the timing skew between the clock signal and the frame signal received by a first source driver has a first skew amount, while the timing skew between the clock signal and the frame signal received by the second source driver has a second skew amount. The first source driver can correctly latch the data of the frame signal based on the first skew amount, but the second source driver might incorrectly latch the data of the frame signal based on the second skew amount.

SUMMARY

The disclosure provides a timing controller and an operation method thereof to output a clock signal and a frame signal to a plurality of source drivers for driving a display panel.

In an embodiment of the disclosure, the aforementioned timing controller includes a timing signal generation part and a frame signal generation part. The timing signal generation part generates a clock signal to a plurality of source drivers for driving the display panel. The frame signal generation part generates a frame signal synchronized with the clock signal. The frame signal includes a plurality of data segments corresponding to different source drivers. The timing controller adjusts a phase of at least one of the clock signal and the frame signal, so that the clock signal has different timing skews for different data segments and is adapted to different transmission path delays between the timing controller and the source drivers.

In an embodiment of the disclosure, the aforementioned operation method includes: generating, by the timing controller, a clock signal to a plurality of source drivers for driving the display panel; generating, by the timing controller, a frame signal synchronized with the clock signal, where the frame signal includes a plurality of data segments corresponding to different source drivers; adjusting a phase of at least one of the clock signal and the frame signal, so that the clock signal has different timing skews for different data segments and is adapted to different transmission path delays between the timing controller and the source drivers.

Based on the above, the timing controller provided in one or more embodiments of the disclosure adjusts the phase of at least one of the clock signal and the frame signal, so that the clock signal has different timing skews for different data segments. By adjusting the timing skews for different data segments, the timing controller can compensate for different transmission path delays between the timing controller and the source drivers, thereby preventing the source drivers from incorrectly latching the data of the frame signal.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
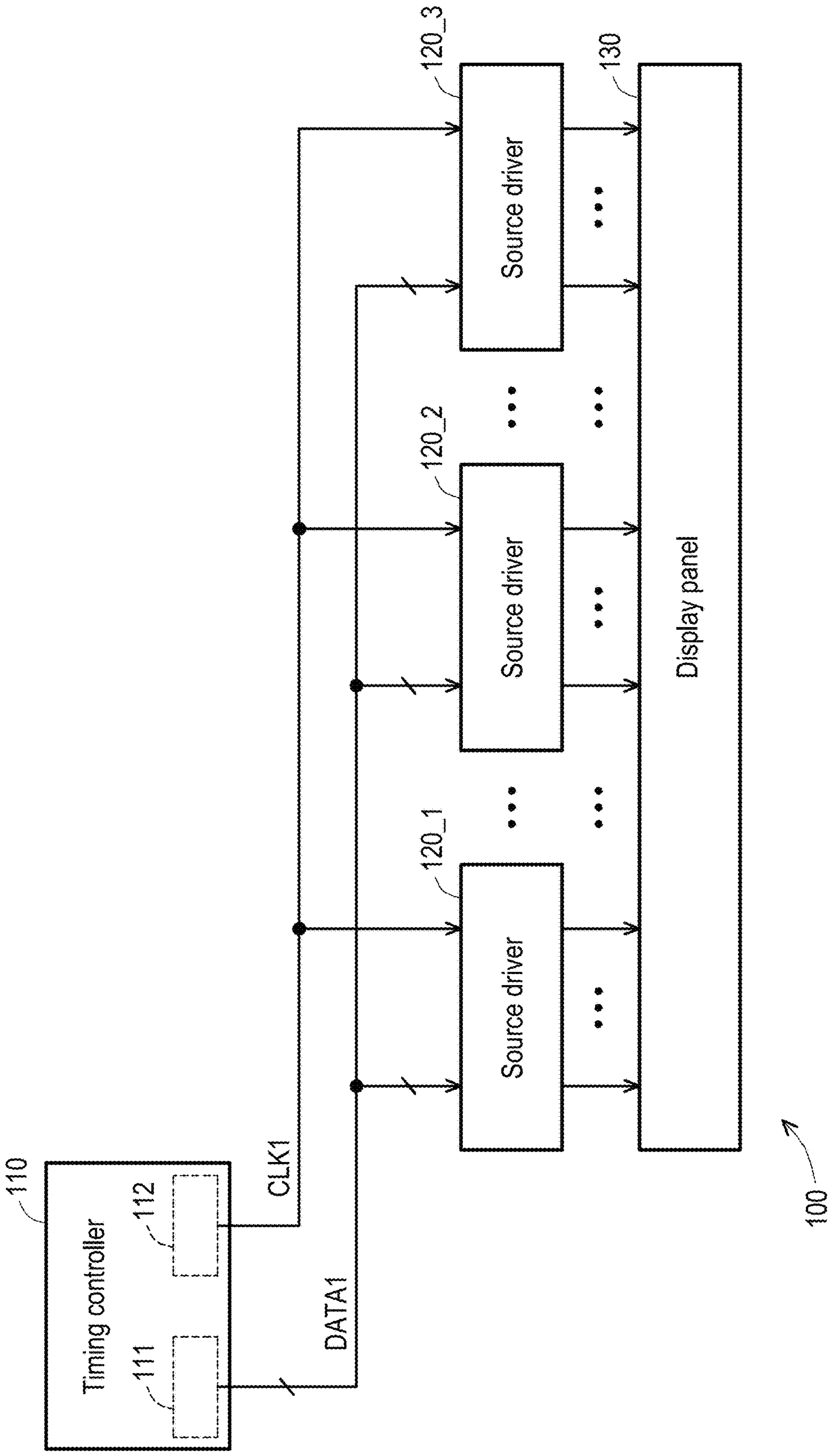
FIG. 1 is a schematic diagram of a circuit block of a display device according to an embodiment of the disclosure.

The terminology "couple (or connect)" used throughout the whole description of the disclosure (including the claims) may refer to any direct or indirect connection means. For instance, if the disclosure describes that a first device is coupled (or connected) to a second device, it should be interpreted that the first device may be directly connected to the second device, or that the first device may be indirectly connected to the second device through other devices or certain connection means. The terminologies such as "first" and "second" mentioned in the description of the disclosure (including the claims) are only used to name different elements or to distinguish different embodiments or scopes and are not intended to limit the upper or lower limit of the number of the elements, nor are they intended to limit the manufacturing order or disposition order of the elements. Moreover, wherever possible, elements/components/steps with the same reference numbers in the drawings and the embodiments denote the same or similar parts. Cross-reference may be made to related descriptions of elements/components/steps with the same reference numbers or the same terminologies in different embodiments.

FIG. 1 is a schematic diagram of a circuit block of a display device 100 according to an embodiment of the disclosure. The display device 100 shown in FIG. 1 includes a timing controller (TCON) 110, a plurality of source drivers (e.g., source drivers 120_1, 120_2, and 120_3 as shown in FIG. 1), and a display panel 130. The actual number of the source drivers in the display device 100 can be determined according to the actual applications. The source drivers 120_1 to 120_3 are configured to drive a plurality of data lines (or referred to as source lines, which are not shown in the drawings) of the display panel 130. In the embodiment shown in FIG. 1, a multi-drop architecture is applied between the timing controller 110 and the source drivers 120_1 to 120_3. In the so-called multi-drop architecture, the timing controller 110 provides a clock signal CLK1 to the source drivers 120_1 to 120_3 through the same clock signal transmission path. Similarly, the timing controller 110 provides a frame signal DATA1 (a data signal) to the source drivers 120_1 to 120_3 through the same frame signal transmission path. For instance, the timing controller 110 transmits the clock signal CLK1 and the frame signal DATA1 to the source drivers 120_1 to 120_3 through a mini-LVDS interface or any other multi-drop architecture interface. Each of the source drivers 120_1 to 120_3 latches data of the frame signal DATA1 based on a phase of the clock signal CLK1. Therefore, a phase relationship (i.e., a timing skew) between the clock signal CLK1 and the frame signal DATA1 is associated with the accuracy of the latched data.

Figure 2:
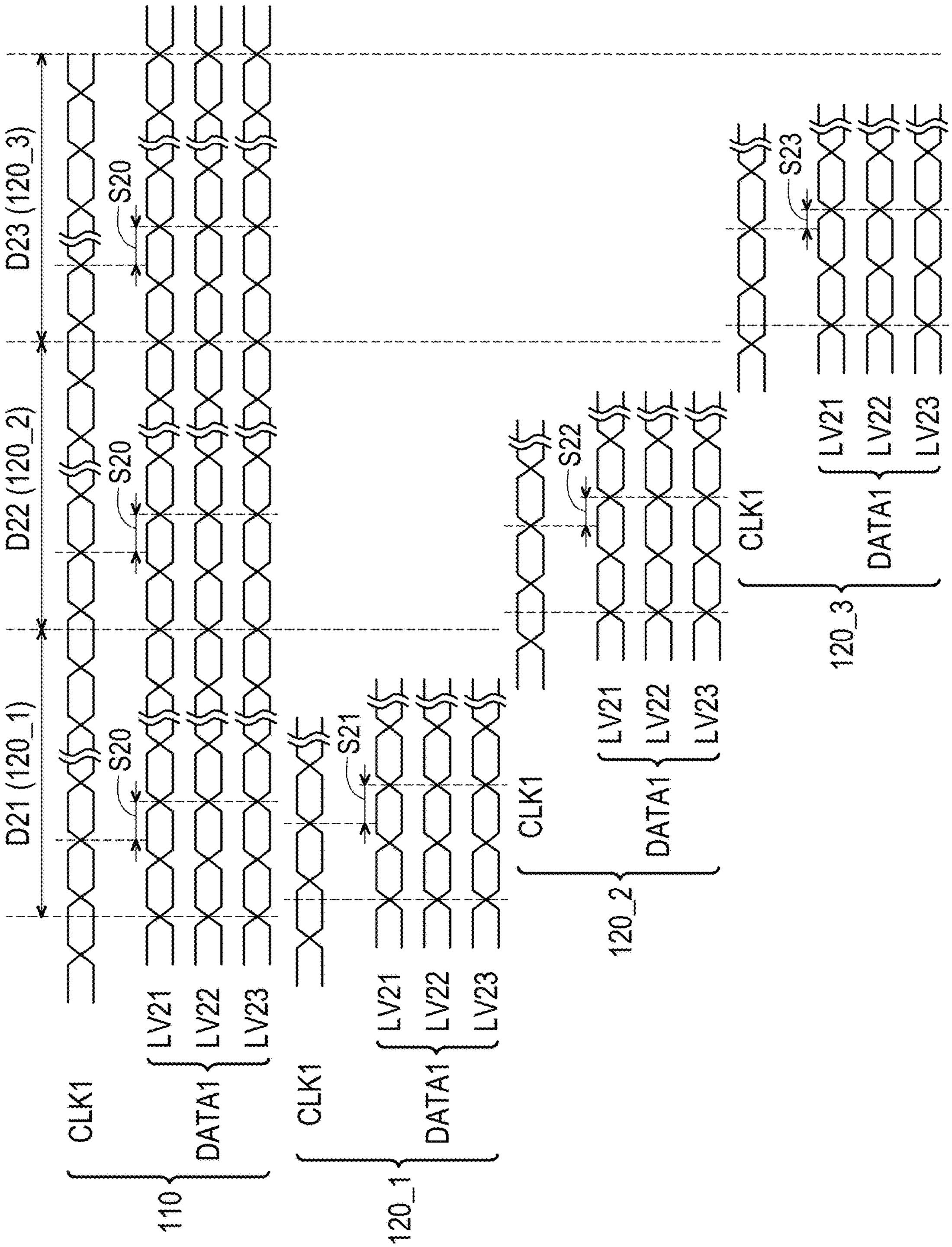
FIG. 2 is a schematic diagram illustrating timing skews between a clock signal and a frame signal received by different source drivers, in the case where "the timing skew between the clock signal and the frame signal output by the timing controller is fixed" according to an embodiment of the disclosure.

FIG. 2 is a schematic diagram illustrating timing skews between the clock signal CLK1 and the frame signal DATA1 received by different source drivers 120_1 to 120_3, in the case where "the timing skew between the clock signal CLK1 and the frame signal DATA1 output by the timing controller 110 is fixed" according to an embodiment of the disclosure. The horizontal axis in FIG. 2 represents time. The upper part of FIG. 2 shows a timing diagram of the clock signal CLK1 and the frame signal DATA1 output by the timing controller 110. The frame signal DATA1 includes a plurality of data segments (e.g., data segments D21, D22, and D23 as shown in FIG. 2) corresponding to different source drivers 120_1 to 120_3. The data segment D21 is to be provided to the source driver 120_1, the data segment D22 is to be provided to the source driver 120_2, and the data segment D23 is to be provided to the source driver 120_3. The frame signal DATA1 includes one to a plurality of differential signal sets (e.g., three differential signal sets LV21, LV22, and LV23) that are provided together to the frame signal transmission path. In the embodiment shown in FIG. 2, the timing skew of the clock signal CLK1 output by the timing controller 110 for different data segments D21 to D23 has the same skew amount S20.

The lower part of FIG. 2 illustrates the timing diagram of the clock signal CLK1 and the frame signal DATA1 received by different source drivers 120_1 to 120_3. In the actual applications of the multi-drop architecture, the clock signal transmission path and the frame signal transmission path often have different transmission path delays. Due to the different transmission paths, different source drivers 120_1 to 120_3 receive the clock signal CLK1 and the frame signal DATA1 with different timing skews. For instance, the timing skew between the clock signal CLK1 and the frame signal DATA1 received by the source driver 120_1 has a skew amount S21, the timing skew between the clock signal CLK1 and the frame signal DATA1 received by the source driver 120_2 has a skew amount S22, and the timing skew between the clock signal CLK1 and the frame signal DATA1 received by the source driver 120_3 has a skew amount S23. The source driver 120_2 can correctly latch the data of the frame signal DATA1 based on the skew amount S22, but the source drivers 120_1 and 120_3 might incorrectly latch the data of the frame signal DATA1 based on the skew amounts S21 and S23.

Even if the timing controller 110 fine-tunes the timing skew of the clock signal CLK1 in the same direction (e.g., towards the right direction), the adjusted timing skew of the clock signal CLK1 may still not simultaneously satisfy each of the source drivers 120_1 to 120_3. For instance, the clock signal CLK1 with the timing skew adjusted towards the right (i.e., reducing the skew amount S20 shown in the upper part of FIG. 2) may be beneficial for the source driver 120_1 to correctly latch the data of the frame signal DATA1, but might not be suitable for the source drivers 120_2 to 120_3. Conversely, the clock signal CLK1 with an increased skew amount S20 shown in the upper part of FIG. 2 may be beneficial for the source driver 120_3 to correctly latch the data of the frame signal DATA1, but might not be suitable for the source drivers 120_1 to 120_2.

The timing controller 110 includes a frame signal generation part 111 and a timing signal generation part 112. According to different designs, in some embodiments, the timing controller 110, the frame signal generation part 111, and/or the timing signal generation part 112 may be implemented in the form of hardware circuits. In other embodiments, the timing controller 110, the frame signal generation part 111, and/or the timing signal generation part 112 may be implemented in the form of hardware, firmware, software (i.e., programs), or a combination of the above.

In terms of hardware, the timing controller 110, the frame signal generation part 111, and/or the timing signal generation part 112 may be implemented in a logic circuit on an integrated circuit. For instance, the relevant functions of the timing controller 110, the frame signal generation part 111, and/or the timing signal generation part 112 may be implemented in various logic blocks, modules, and circuits in one or more hardware controllers, microcontrollers, hardware processors, microprocessors, application-specific integrated circuits (ASIC), digital signal processors (DSP), field programmable gate arrays (FPGA), central processing units (CPU), and/or other processing units. The relevant functions of the timing controller 110, the frame signal generation part 111, and/or the timing signal generation part 112 may be implemented as hardware circuits, such as various logic blocks, modules, and circuits in integrated circuits, using hardware description languages (e.g., Verilog HDL or VHDL) or other suitable programming languages.

In terms of software and/or firmware, the relevant functions of the timing controller 110, the frame signal generation part 111, and/or the timing signal generation part 112 may be implemented by programming codes. For instance, the timing controller 110, the frame signal generation part 111, and/or the timing signal generation part 112 may be implemented using general programming languages (e.g., C, C++, or assembly language) or other suitable programming languages. The programming codes can be recorded/stored in a "non-transitory machine-readable storage medium". In some embodiments, the non-transitory machine-readable storage medium can include a semiconductor memory and/or a storage device. An electronic device (e.g., a computer, a CPU, a hardware controller, a microcontroller, a hardware processor, or a microprocessor) can read out and execute the programming codes from the non-transitory machine-readable storage medium, thereby implementing the relevant functions of the timing controller 110, the frame signal generation part 11, and/or the timing signal generation part 112.

Figure 3:
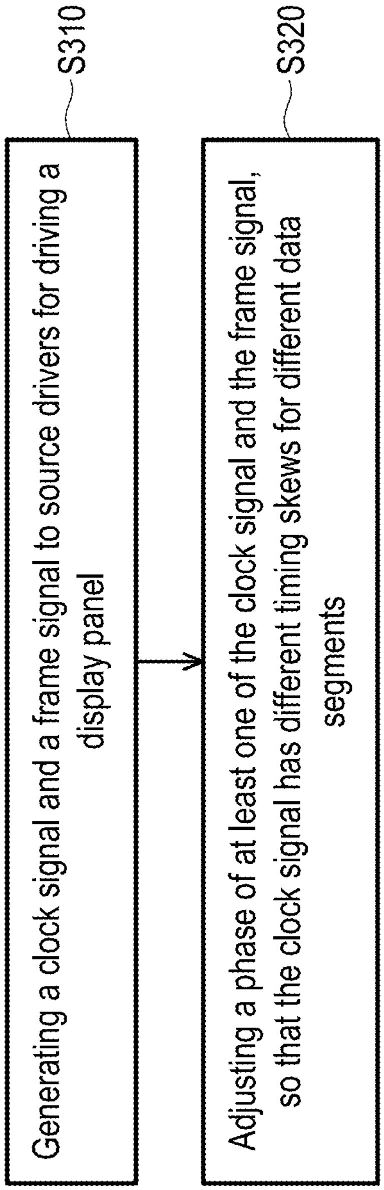
FIG. 3 is a flowchart of an operation method of a display device according to an embodiment of the disclosure.

FIG. 3 is a flowchart of an operation method of a display device according to an embodiment of the disclosure. Please refer to FIG. 1 and FIG. 3. In step S310, the timing signal generation part 112 generates the clock signal CLK1 to the source drivers 120_1 to 120_3 for driving the display panel 130. The frame signal generation part 111 generates the frame signal DATA1 synchronized with the clock signal CLK1. The frame signal DATA1 includes the data segments corresponding to different source drivers 120_1 to 120_3.

Figure 4:
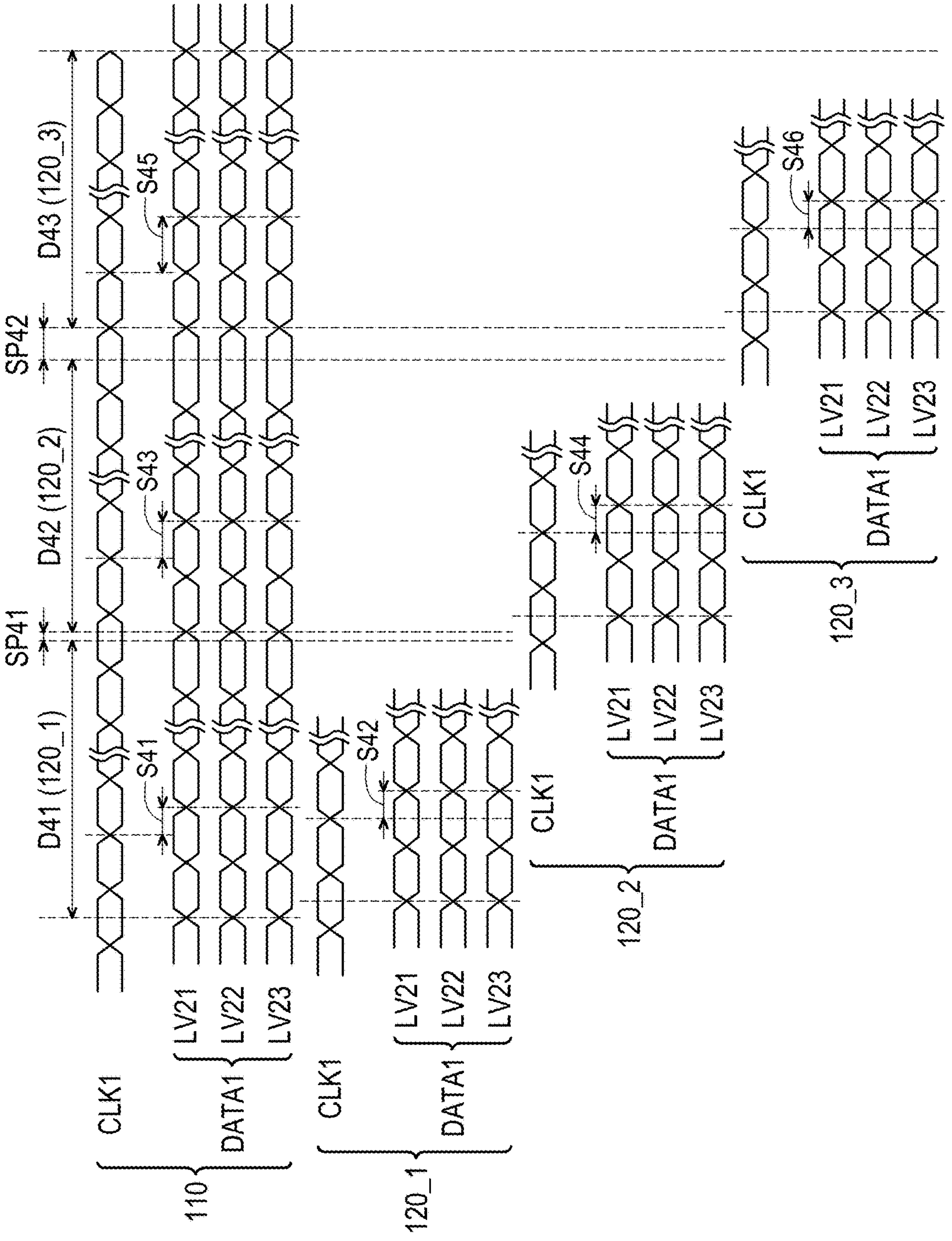
FIG. 4 is a schematic diagram illustrating timing skews between a clock signal and a frame signal received by different source drivers, in the case where "the timing skew between the clock signal and the frame signal output by the timing controller is adapted to different transmission path delays between the timing controller and different source drivers" according to an embodiment of the disclosure.

FIG. 4 is a schematic diagram illustrating timing skews between the clock signal CLK1 and the frame signal DATA1 received by different source drivers 120_1 to 120_3, in the case where "the timing skew between the clock signal CLK1 and the frame signal DATA1 output by the timing controller 110 is adapted to different transmission path delays between the timing controller 110 and different source drivers 120_1 to 120_3" according to an embodiment of the disclosure. The horizontal axis in FIG. 4 represents time. The upper part of FIG. 4 shows a timing diagram of the clock signal CLK1 and the frame signal DATA1 output by the timing controller 110.

The frame signal DATA1 includes one to a plurality of differential signal sets (e.g., three differential signal sets LV21, LV22, and LV23) that are provided together to the frame signal transmission path. The frame signal DATA1 includes the data segments (e.g., data segments D41, D42, and D43 as shown in FIG. 4) corresponding to different source drivers 120_1 to 120_3, for instance. The data segment D41 is to be provided to the source driver 120_1, the data segment D42 is to be provided to the source driver 120_2, and the data segment D43 is to be provided to the source driver 120_3.

In step S320, the timing controller 110 adjusts the phase of at least one of the clock signal CLK1 and the frame signal DATA1, so that the clock signal CLK1 has different timing skews for different data segments D41 to D43 and is adapted to different transmission path delays between the timing controller 110 and different source drivers 120_1 to 120_3. In the embodiment shown in FIG. 4, the timing skew of the clock signal CLK1 output by the timing controller 110 is adaptively adjusted to have a skew amount S41 for the data segment D41, the timing skew of the clock signal CLK1 is adaptively adjusted to have a skew amount S43 for the data segment D42, and the timing skew of the clock signal CLK1 is adaptively adjusted to have a skew amount S45 for the data segment D43.

For instance, as shown in FIG. 4, the clock signal CLK1 includes a first clock segment corresponding to the data segment D41, a second clock segment corresponding to the data segment D42, and a third clock segment corresponding to the data segment D43. The timing controller 110 adjusts a phase of the first clock segment of the clock signal CLK1 to a first phase, the timing controller 110 adjusts a phase of the second clock segment of the clock signal CLK1 to a second phase different from the first phase, and the timing controller 110 adjusts a phase of the third clock segment of the clock signal CLK1 to a third phase different from the first phase and the second phase, so that the clock signal CLK1 has different timing skews S41, S43, and S45 for different data segments D41 to D43.

In another example, the timing controller 110 adjusts a phase of the data segment D41 of the frame signal DATA1 to the first phase, the timing controller 110 adjusts a phase of the data segment D42 of the frame signal DATA1 to the second phase different from the first phase, and the timing controller 110 adjusts a phase of the data segment D43 of the frame signal DATA1 to the third phase different from the first phase and the second phase. Therefore, the timing controller 110 can ensure that the clock signal CLK1 has different timing skews S41, S43, and S45 for different data segments D41 to D43.

The lower part of FIG. 4 illustrates the timing diagram of the clock signal CLK1 and the frame signal DATA1 received by different source drivers 120_1 to 120_3. In the actual applications of the multi-drop architecture, the clock signal transmission path and the frame signal transmission path often have different transmission path delays. Since the timing controller 110 has adaptively adjusted the timing skew of the clock signal CLK1 to have different skew amounts S41, S43, and S45 for different data segments D41 to D43, the timing skew between the clock signal CLK1 and the frame signal DATA1 received by different source drivers 120_1 to 120_3 can be optimized.

For instance, the timing skew between the clock signal CLK1 and the frame signal DATA1 received by the source driver 120_1 has a skew amount S42, the timing skew between the clock signal CLK1 and the frame signal DATA1 received by the source driver 120_2 has a skew amount S44, and the timing skew between the clock signal CLK1 and the frame signal DATA1 received by the source driver 120_3 has a skew amount S46. Since the timing controller 110 has adaptively adjusted the timing skew of the clock signal CLK1 to have different skew amounts S41, S43, and S45 for different data segments D41 to D43, the timing skew amounts S42, S44, and S46 between the clock signal CLK1 and the frame signal DATA1 received by different source drivers 120_1 to 120_3 can all approach the optimized skew amount. The source driver 120_1 accurately latches the data of the frame signal DATA1 based on the optimized skew amount S42, the source driver 120_2 latches the data of the frame signal DATA1 based on the optimized skew amount S44, and the source driver 120_3 latches the data of the frame signal DATA1 correctly based on the optimized skew amount S46.

In summary, the timing controller 110 adjusts the phase of at least one of the clock signal CLK1 and the frame signal DATA1, causing the clock signal CLK1 to have different timing skews S41, S43, and S45 for different data segments D41 to D43. By adjusting the timing skews S41, S43, and S45 for different data segments D41 to D43, the timing controller 110 can compensate for different transmission path delays between the timing controller 110 and the source drivers 120_1 to 120_3, thereby preventing the source drivers 120_1 to 120_3 from inaccurately latching the data of the frame signal DATA1.

In the embodiment shown in FIG. 4, there is a stop period SP41 between a period of outputting the data segment D41 and a period of outputting the data segment D42, and there is a stop period SP42 between the period of outputting the data segment D42 and a period of outputting the data segment D43. The timing controller 110 stops toggling the clock signal CLK1 during the stop periods SP41 and SP42. The timing controller 110 can also set the signal characteristics of at least one of the clock signal CLK1 and the frame signal DATA1 during the stop periods SP41 and SP42 based on at least one signal characteristic parameter. In view of the actual design, the signal characteristics include at least one of a phase, a slew rate, a swing, and a pre-emphasis.

Figure 5:
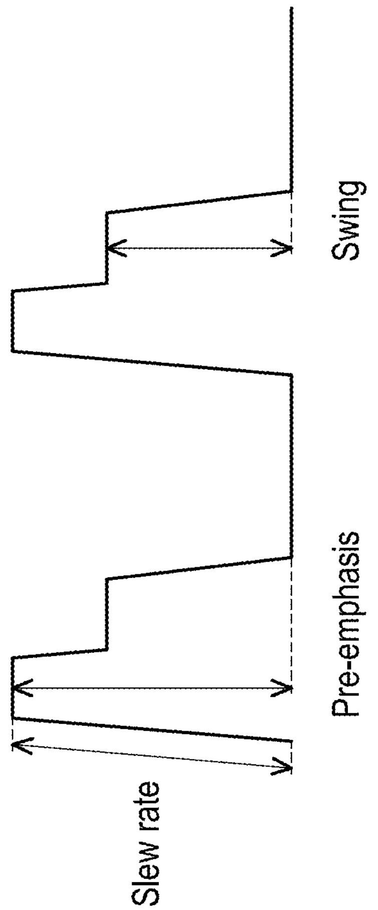
FIG. 5 is a schematic diagram of waveforms of signals output by the timing controller according to an embodiment of the disclosure.

FIG. 5 is a schematic diagram of waveforms of signals output by the timing controller 110 according to an embodiment of the disclosure. The horizontal axis in FIG. 5 represents time. The pulses shown in the left part of FIG. 5 indicate the physical significance of the slew rate and the pre-emphasis for the waveform, while the pulse shown in the right part of FIG. 5 indicates the physical significance of the swing for the waveform.

The timing controller 110 can set the signal characteristics (e.g., at least one of the phase, the slew rate, the swing, and the pre-emphasis) of at least one of the clock signal CLK1 and the frame signal DATA1 during the stop periods SP41 and SP42 based on at least one signal characteristic parameter. Through adaptive adjustment of the signal characteristics, the timing controller 110 can disperse the signal intensity in the frequency domain or time domain, thereby reducing electromagnetic interference (EMI) energy. Additionally, since the swing of the relatively short transmission path is reduced, the power consumption of the timing controller 110 can also decrease, providing the advantage of reduced power.

Besides, the timing controller 110 described in the embodiment depicted in FIG. 3 can overcome high-speed transmission issues when paired with general source drivers available in the current market. The timing controller 110 adjusts a CLK skew given to each source driver. When paired with corresponding source drivers, the timing controller 110 can define a golden key and a hand shake mechanism in the transmitted data content, whereby the timing controller 110 can, through an automatic adjustment method, adjust and determine the optimal CLK skew for each source driver, thereby increasing application convenience.

Figure 6:
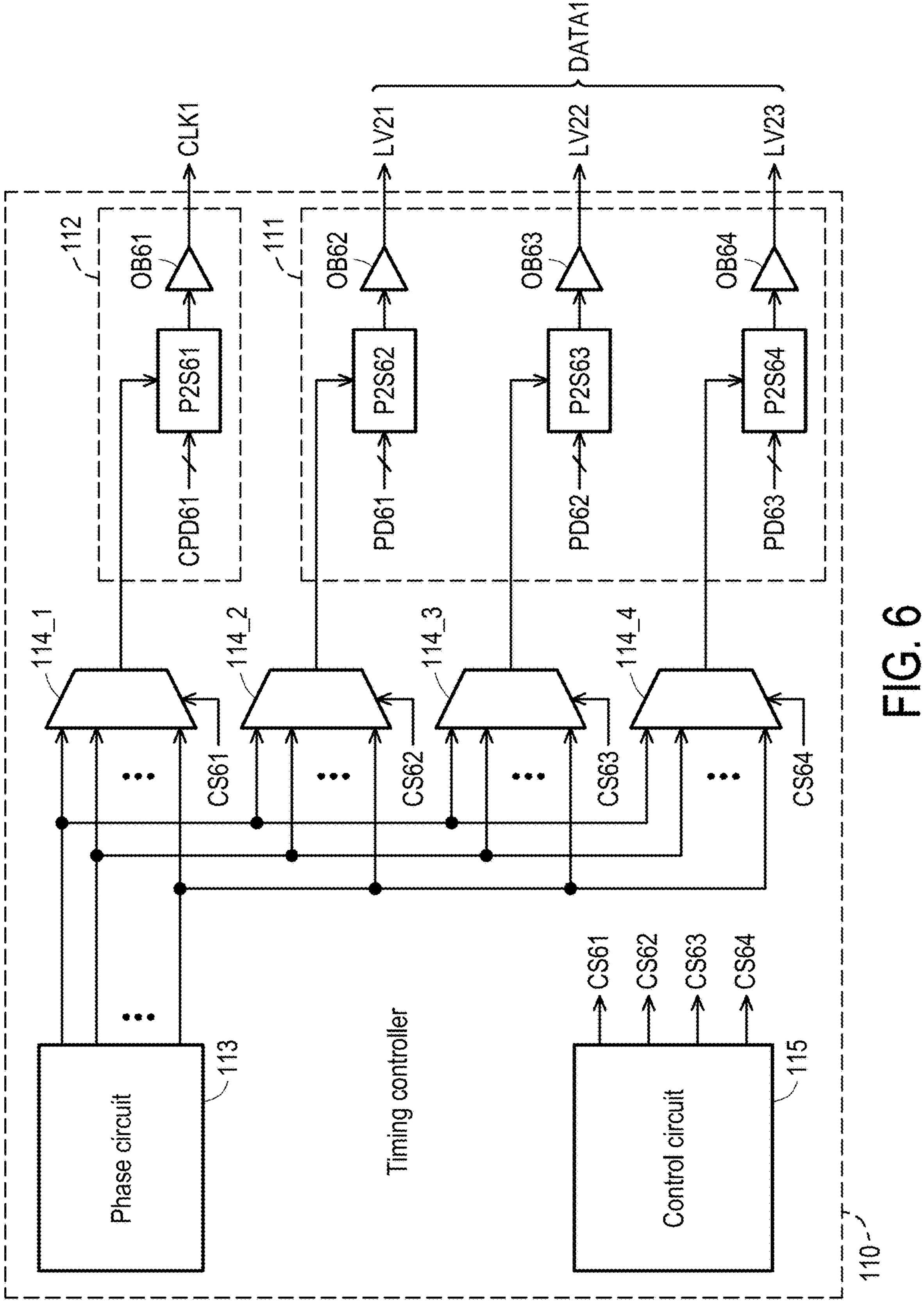
FIG. 6 is a schematic diagram of a circuit block of the timing controller according to an embodiment of the disclosure.

FIG. 6 is a schematic diagram of a circuit block of the timing controller 110 according to an embodiment of the disclosure. The timing controller 110 shown in FIG. 6 can serve as one of many implementation examples of the timing controller 110 shown in FIG. 1. The descriptions of the timing controller 110 shown in FIG. 6 may be referred to as those depicted in FIG. 1 and FIG. 3 to FIG. 5. In the embodiment shown in FIG. 6, the timing controller 110 includes a frame signal generation part 111, a timing signal generation part 112, a phase circuit 113, selection circuits 114_1, 114_2, 114_3, and 114_4, and a control circuit 115. The control circuit 115 outputs control signals CS61, CS62, CS63, and CS64 to the selection circuits 114_1 to 114_4 to control the routing of the selection circuits 114_1 to 114_4.

The phase circuit 113 generates a plurality of candidate pulse trains with different phases to the selection circuits 114_1 to 114_4. The selection circuits 114_1 to 114_4 are coupled to the phase circuit 113 to receive the candidate pulse trains. Based on the control of the control circuit 115, the selection circuit 114_1 selects one of the candidate pulse trains as a first trigger pulse train for the timing signal generation part 112, so as to adjust the phase of the clock signal CLK1.

In the embodiment shown in FIG. 6, the timing signal generation part 112 includes a parallel-to-serial converter P2S61 and an output buffer OB61. The parallel-to-serial converter P2S61 converts CLK pattern data CPD61 into the clock signal CLK1 based on the trigger pulse train output by the selection circuit 114_1. An input terminal of the output buffer OB61 is coupled to an output terminal of the parallel-to-serial converter P2S61, where the output buffer OB61 outputs the clock signal OB61 to the source drivers 120_1 to 120_3.

In the embodiment shown in FIG. 6, the frame signal DATA1 includes a plurality of differential signal sets (e.g., three differential signal sets LV21, LV22, and LV23). The selection circuit 114_2 selects one of the candidate pulse trains generated by the phase circuit 113 as a second trigger pulse train for the frame signal generation part 111, so as to adjust a phase of the differential signal LV21 of the frame signal DATA1. Similarly, the selection circuit 114_3 selects one of the candidate pulse trains as a third trigger pulse train for the frame signal generation part 111, and the selection circuit 114_2 selects one of the candidate pulse trains as a fourth trigger pulse train for the frame signal generation part 111, so as to adjust phases of the differential signals LV22 and LV23 of the frame signal DATA1.

In the embodiment shown in FIG. 6, the frame signal generation part 111 includes a plurality of parallel-to-serial converters (e.g., parallel-to-serial converters P2S62, P2S63, and P2S64 as shown in FIG. 6) and a plurality of output buffers (e.g., output buffers OB62, OB63, and OB64 as shown in FIG. 6). The parallel-to-serial converter P2S62 converts parallel data PD61 into the differential signal LV21 of the frame signal DATA1 based on the trigger pulse train output by the selection circuit 114_2. An input terminal of the output buffer OB62 is coupled to an output terminal of the parallel-to-serial converter P2S62. The output buffer OB62 outputs the differential signal LV21 to the source drivers 120_1 to 120_3. The parallel-to-serial converter P2S63 converts parallel data PD62 into the differential signal LV22 of the frame signal DATA1 based on the trigger pulse train output by the selection circuit 114_3. An input terminal of the output buffer OB63 is coupled to an output terminal of the parallel-to-serial converter P2S63. The output buffer OB63 outputs the differential signal LV22 to the source drivers 120_1 to 120_3. The parallel-to-serial converter P2S64 converts parallel data PD63 into the differential signal LV23 of the frame signal DATA1 based on the trigger pulse train output by the selection circuit 114_4. An input terminal of the output buffer OB64 is coupled to an output terminal of the parallel-to-serial converter P2S64. The output buffer OB64 outputs the differential signal LV23 to the source drivers 120_1 to 120_3.

Figure 7:
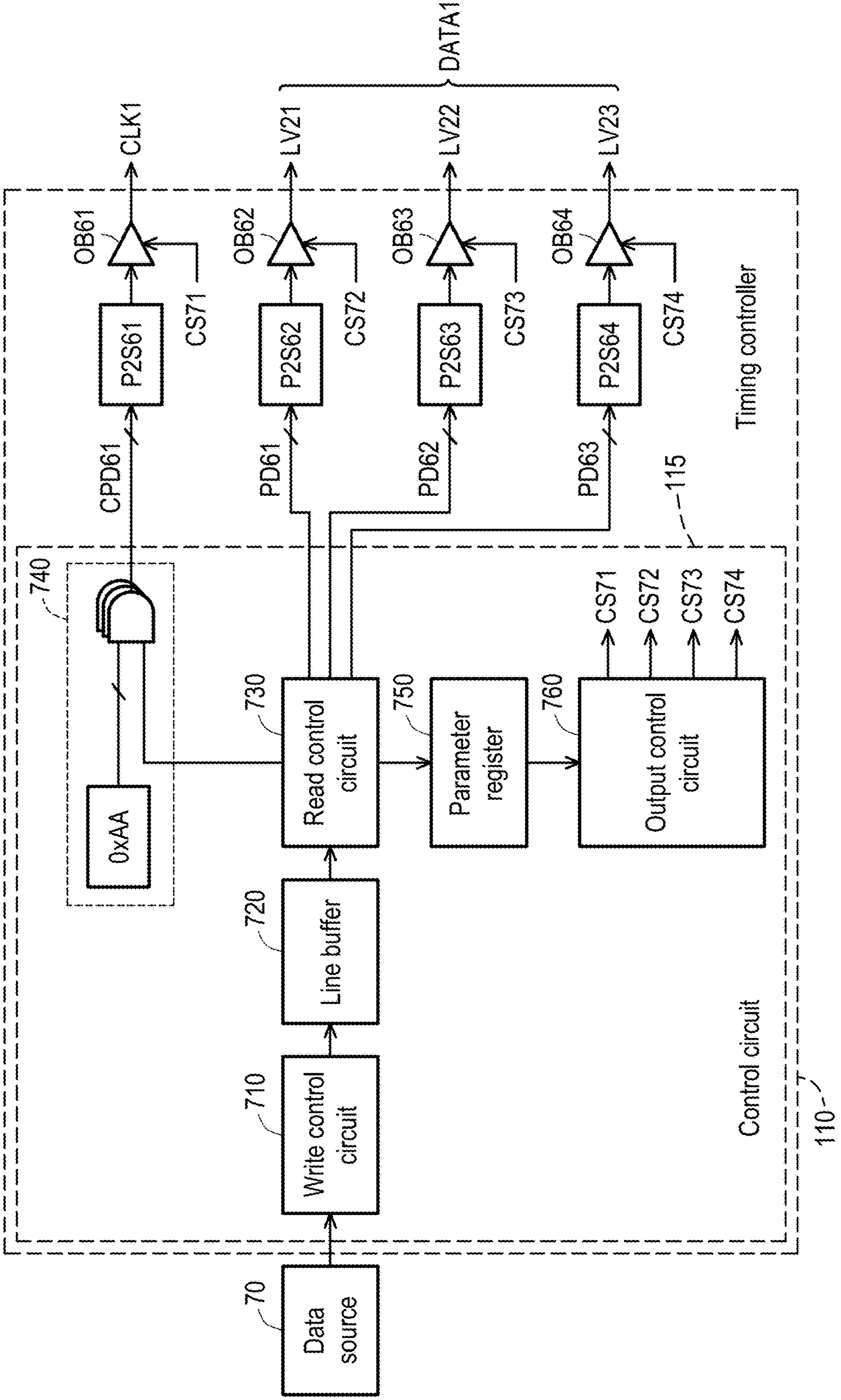
FIG. 7 is a schematic diagram of a circuit block of a control circuit according to an embodiment of the disclosure.

FIG. 7 is a schematic diagram of a circuit block of a control circuit 115 according to an embodiment of the disclosure. The control circuit 115 shown in FIG. 7 can act as one of many implementation examples of the control circuit 115 shown in FIG. 6. The relevant descriptions of the control circuit 115, the parallel-to-serial converter P2S61, the parallel-to-serial converter P2S62, the parallel-to-serial converter P2S63, the parallel-to-serial converter P2S64, the output buffer OB61, the output buffer OB62, the output buffer OB63, and the output buffer OB64 shown in FIG. 7 can be referred to as those depicted in FIG. 6. In the embodiment shown in FIG. 7, the control circuit 115 includes a write control circuit 710, a line buffer 720, a read control circuit 730, a logic circuit 740, a parameter register 750, and an output control circuit 760.

The write control circuit 710 is coupled to the line buffer 720. The write control circuit 710 receives different data segments from a data source 70. Based on different applications, the data source 70 can include a scalar, a graphics processing unit (GPU), or any other data source. The data source 70 transmits different data segments (data signals) to the write control circuit 710 through a transmission interface (e.g., LVDS). The write control circuit 710 sequentially writes the data segments into the line buffer 720. The read control circuit 730 is coupled to the line buffer 720. The read control circuit 730 reads out corresponding data segments (the parallel data PD61 to PD63) from the line buffer 720 at different times and provides them to the parallel-to-serial converters P2S62 to P2S64 of the frame signal generation part 111.

Figure 8:
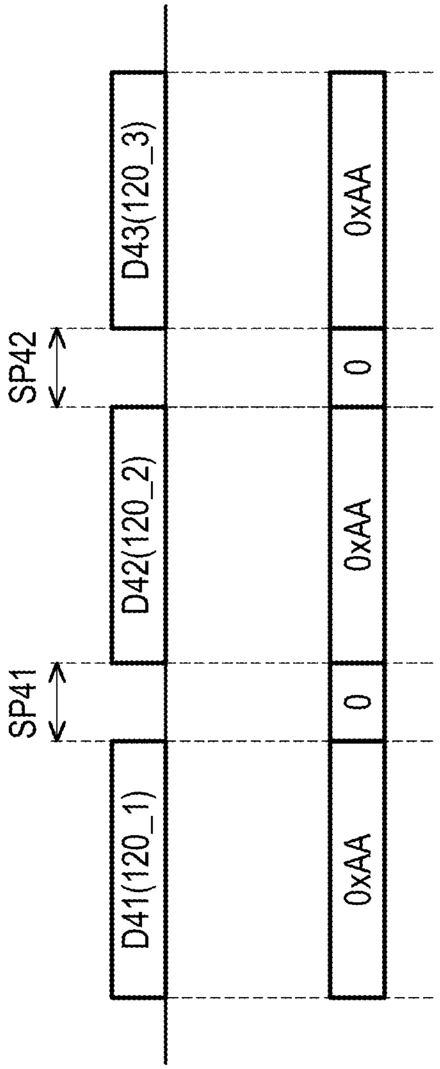
FIG. 8 is a schematic timing diagram illustrating data read out from a line buffer by a read control circuit at different times according to an embodiment of the disclosure.

For instance, FIG. 8 is a schematic timing diagram illustrating data read out from the line buffer 720 by the read control circuit 730 at different times according to an embodiment of the disclosure. The horizontal axis of FIG. 8 represents time. Please refer to FIG. 4, FIG. 7, and FIG. 8. The read control circuit 730 reads out the data segment D41 from the line buffer 720 and provides it to the parallel-to-serial converters P2S62 to P2S64 during a first period. During the stop period SP41 after the first period, the read control circuit 730 stops reading out any data segment from the line buffer 720. During a second period after the stop period SP41, the read control circuit 730 reads out the data segment D42 from the line buffer 720 and provides it to the parallel-to-serial converters P2S62 to P2S64. During the stop period SP42 after the second period, the read control circuit 730 stops reading out any data segment from the line buffer 720. During a third period after the stop period SP42, the read control circuit 730 reads out the data segment D43 from the line buffer 720 and provides it to the parallel-to-serial converters P2S62 to P2S64.

The logic circuit 740 is controlled by the read control circuit 730. In response to the read control circuit 730 reading out the data segment D41 from the line buffer 720 and providing it to the parallel-to-serial converters P2S62 to P2S64 during the first period, the logic circuit 740 outputs the CLK pattern data CPD61 to the parallel-to-serial converter P2S61 of the timing signal generation part 112 to generate the clock signal CLK1. The actual pattern of the CLK pattern data CPD61 can be determined according to the actual design and applications. For instance, the CLK pattern data CPD61 can be a plurality of continuous "0xAA" (hexadecimal number AA, i.e., binary number 10101010) or other patterns.

In response to the read control circuit 730 stopping reading out any data segment from the line buffer 720 during the stop period SP41, the logic circuit 740 stops outputting the CLK pattern data CPD61 to the parallel-to-serial converter P2S61 to stop generating the clock signal CLK1. The timing controller 110 determines the partitioning of data required by different source drivers 120_1 to 120_3. By controlling the reading from the line buffer 720, the logic circuit 740 inserts the corresponding number of dummy data (e.g., "0") during the stop period SP41 between different periods. The corresponding number of dummy data can allow the timing controller 110 sufficient operation time to toggle characteristic parameters. In response to the read control circuit 730 reading out the data segment D42 from the line buffer 720 and providing it to the parallel-to-serial converters P2S62 to P2S64 during the second period, the logic circuit 740 outputs the CLK pattern data CPD61 to the parallel-to-serial converter P2S61 to resume generating the clock signal CLK1.

The parameter register 750 is coupled to the read control circuit 730. The read control circuit 730 writes at least one characteristic parameter into the parameter register 750. Based on the actual design, the characteristic parameters include control parameters associated with at least one of the phase, the slew rate, the swing, and the pre-emphasis. The output control circuit 760 is coupled to the parameter register 750. The output control circuit 760 outputs control signals CS71, CS72, CS73, and CS74 to the output buffers OB61 to OB64. The output control circuit 760 generates the control signals CS71 to CS74 based on the characteristic parameters in the parameter register 750 to control the signal characteristics of at least one of the output buffers OB61 to OB64 (i.e., setting the signal characteristics of at least one of the clock signal CLK1 and the differential signals LV21 to LV23). For instance, during the stop periods SP41 and SP42 (periods when the control circuit 115 stops toggling the clock signal CLK1), the output control circuit 760 can set the signal characteristics of at least one of the output buffers OB61 to OB64 based on the characteristic parameters in the parameter register 750. Based on the actual design, the signal characteristics include at least one of the phase, the slew rate, the swing, and the pre-emphasis.

Figure 9:
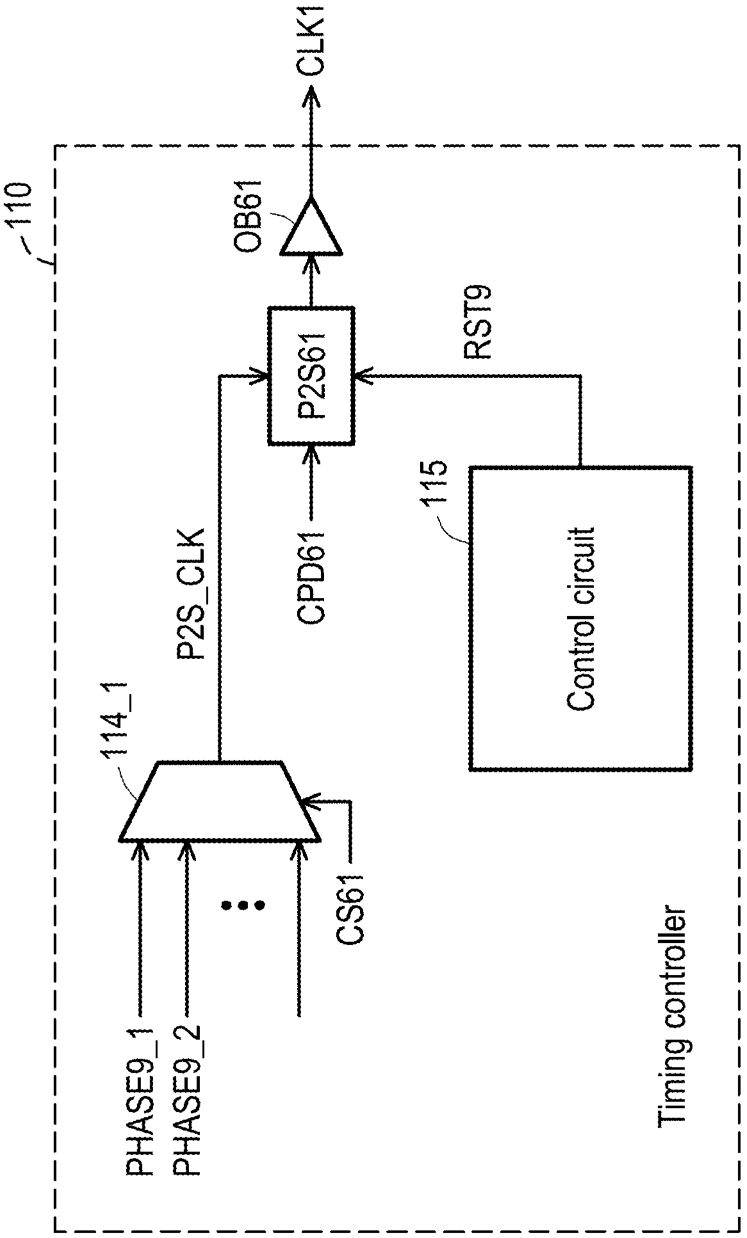
FIG. 9 is a schematic diagram of a circuit block of the timing controller according to an embodiment of the disclosure.

FIG. 9 is a schematic diagram of a circuit block of the timing controller 110 according to an embodiment of the disclosure. The control circuit 115, the descriptions of the selection circuit 114_1, the parallel-to-serial converter P2S61, and the output buffer OB61 shown in FIG. 9 can be referred to as those depicted in FIG. 6. Please refer to FIG. 6 and FIG. 9. Based on the control of the control circuit 115, the selection circuit 114_1 selects one of the candidate pulse trains generated by the phase circuit 113 (e.g., candidate pulse trains PHASE9_1 and PHASE9_2 shown in FIG. 9) as a trigger pulse train P2S_CLK for the parallel-to-serial converter P2S61 to adjust the phase of the clock signal CLK1. Based on the trigger pulse train P2S_CLK output by the selection circuit 1141, the parallel-to-serial converter P2S61 converts the CLK pattern data CPD61 into the clock signal CLK1. In the embodiment shown in FIG. 9, the control circuit 115 can output a reset signal RST9 to reset the parallel-to-serial converter P2S61.

Figure 10:
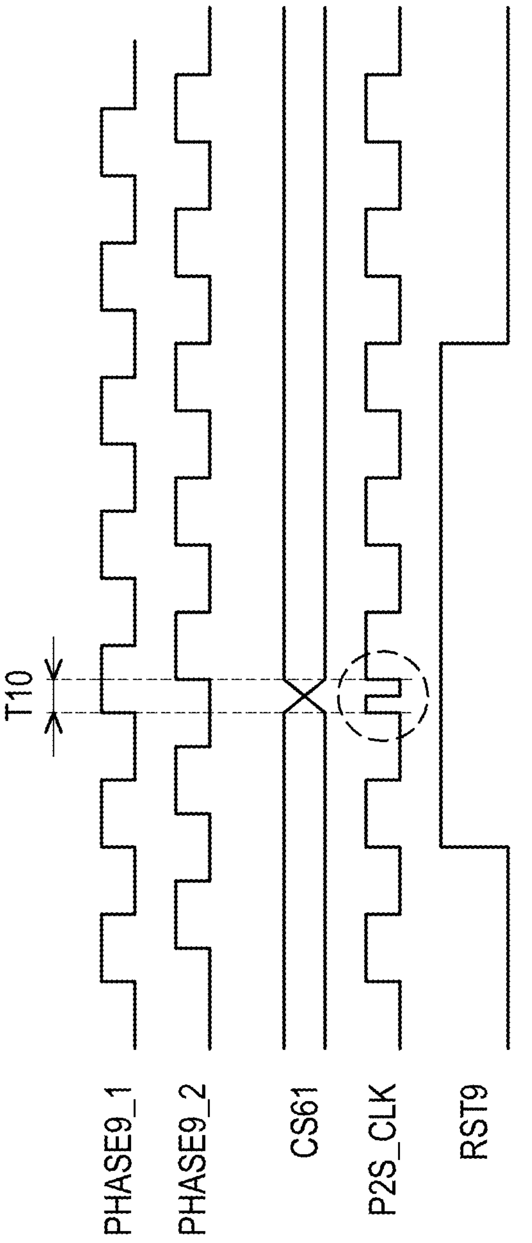
FIG. 10 is a schematic diagram of waveforms illustrating the occurrence of glitches in a trigger pulse train according to an embodiment of the disclosure.

FIG. 10 is a schematic diagram of waveforms illustrating the occurrence of glitches in a trigger pulse train P2S_CLK according to an embodiment of the disclosure. The horizontal axis in FIG. 10 represents time. Please refer to FIG. 9 and FIG. 10. During a process of toggling between different CLK skews, glitches may occur in the trigger pulse train P2S_CLK output by the selection circuit 114_1. The control circuit 115 can serve as a glitch free circuit to prevent the parallel-to-serial converter P2S61 from erroneously reading out the CLK pattern data CPD61 due to glitches in the trigger pulse train P2S_CLK. In a time zone T10 during which glitches may occur in the trigger pulse train P2S_CLK, the control circuit 115 resets the parallel-to-serial converter P2S61 through the reset signal RST9 (for instance, by pulling the reset signal RST9 up to a high level). After the phase toggling of the selection circuit 114_1 is completed, the control circuit 115 releases the reset signal RST9 (for instance, by pulling it down to a low level).

In the embodiment shown in FIG. 9 and FIG. 10, the parallel-to-serial converter P2S61 is taken as an example to illustrate the glitch free operation. The descriptions associated with the glitch free operation for the parallel-to-serial converter P2S61 can be analogized to other parallel-to-serial converters, such as the parallel-to-serial converters P2S62 to P2S64. The related descriptions depicted in FIG. 4 to FIG. 10 mentioned above demonstrate that there are stop periods (such as SP41 and SP42) between the periods of outputting different data segments. In other embodiments, there may be no stop periods between the periods of outputting different data segments.

Figure 11:
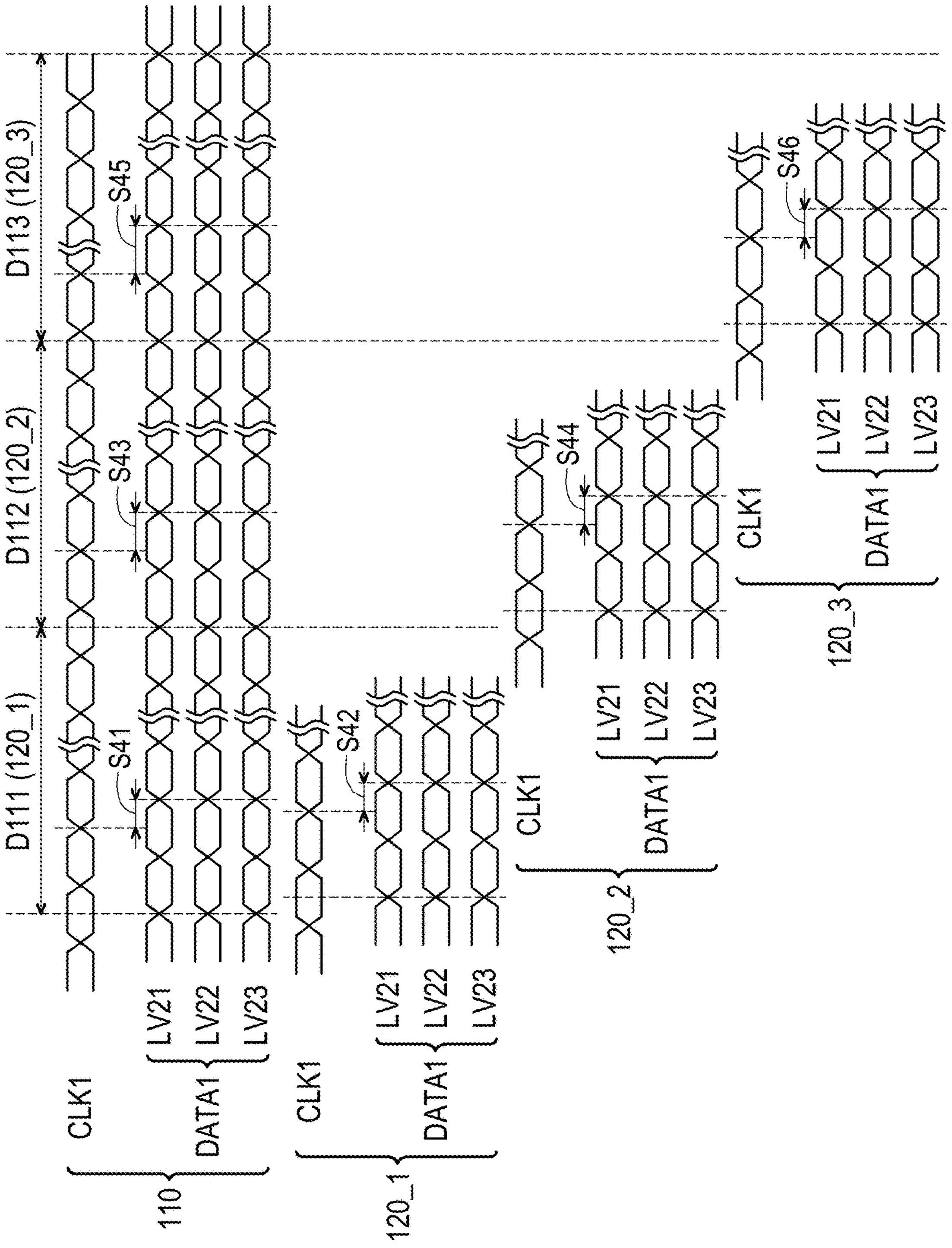
FIG. 11 and FIG. 12 are schematic diagrams illustrating timing skews between a clock signal and a frame signal received by different source drivers, in the case where "the timing skew between the clock signal and the frame signal output by the timing controller is adapted to different transmission path delays between the timing controller and different source drivers" according to other embodiments of the disclosure.
Figure 12:
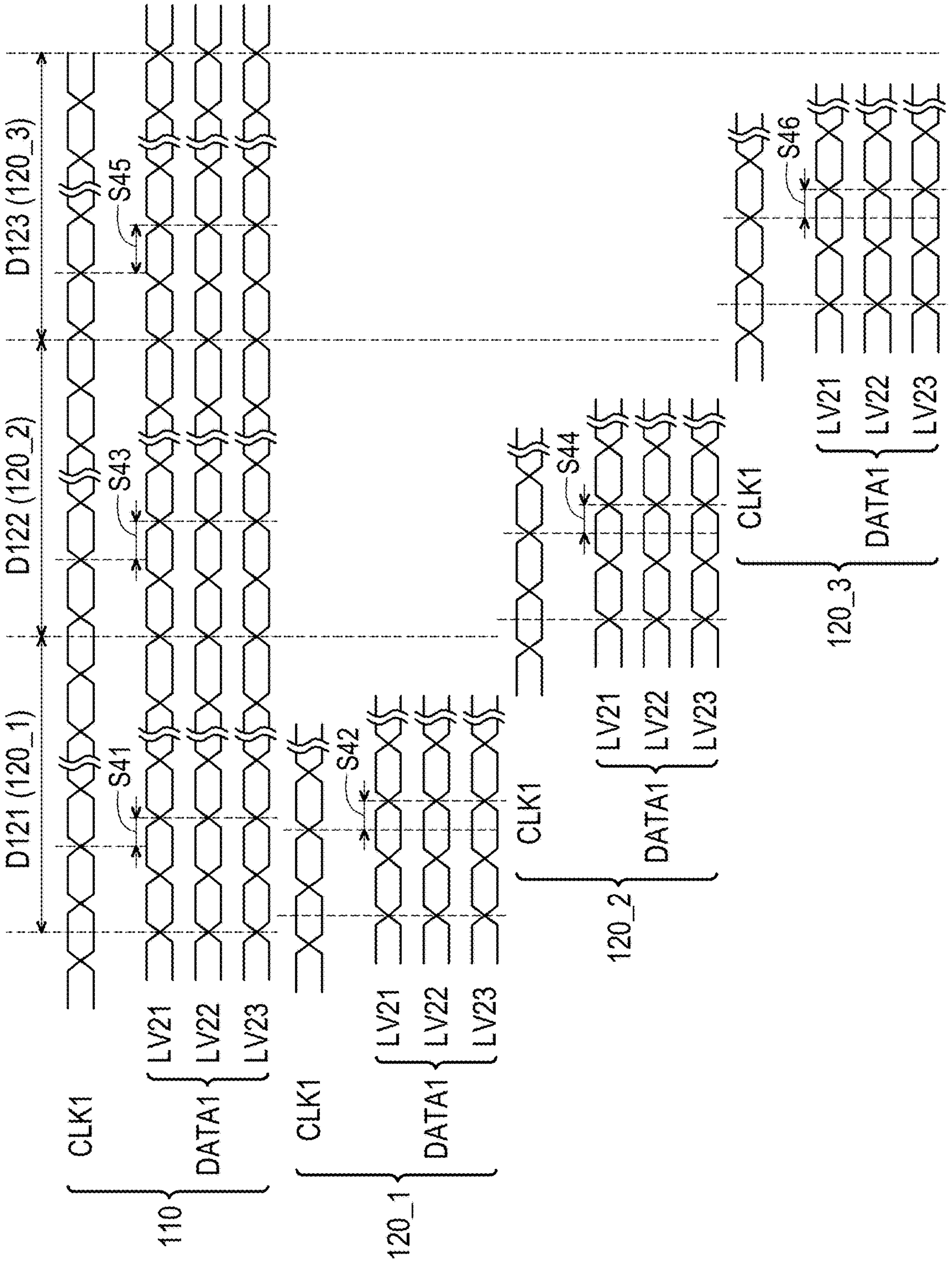

For instance, FIG. 11 and FIG. 12 are schematic diagrams illustrating timing skews between the clock signal CLK1 and the frame signal DATA1 received by different source drivers 120_1 to 120_3, in the case where "the timing skew between the clock signal CLK1 and the frame signal DATA1 output by the timing controller 110 is adapted to different transmission path delays between the timing controller 110 and different source drivers 120_1 to 120_3" according to other embodiments of the disclosure. The horizontal axes in FIG. 11 and FIG. 12 represent time. The upper parts of FIG. 11 and FIG. 12 show the timing diagram of the clock signal CLK1 and the frame signal DATA1 output by the timing controller 110. The lower parts of FIG. 11 and FIG. 12 show the timing diagram of the clock signal CLK1 and the frame signal DATA1 received by different source drivers 120_1 to 120_3. The related description depicted in FIG. 4 can be analogized to the embodiments shown in FIG. 11 and FIG. 12, and the difference therebetween lies in that there may be no stop periods between the periods of outputting different data segments D111, D112, and D113 according to the embodiment shown in FIG. 11, and in the embodiment shown in FIG. 12, there may be no stop periods between output periods of outputting different data segments D121, D122, and D123.

In the embodiment shown in FIG. 11, the timing controller 110 adjusts the phase of the clock signal CLK1, so that the clock signal CLK1 has different timing skews for different data segments D41 to D43. Please refer to FIG. 6 and FIG. 11. The control circuit 115 controls the routing of the selection circuit 114_1 through the control signal CS61. Based on the control of the control circuit 115, the selection circuit 114_1 selects different trigger pulse trains corresponding to different source drivers 120_1 to 120_3 from the candidate pulse trains for the parallel-to-serial converter P2S61 to adjust the phase of the clock signal CLK1. Therefore, the clock signal CLK1 output by the timing controller 110 has different timing skews for different data segments D41 to D43 and is adapted to different transmission path delays between the timing controller 110 and the source drivers 120_1 to 120_3.

In the embodiment shown in FIG. 12, the timing controller 110 adjusts the phase of the frame signal DATA1 (the differential signals LV21 to LV23), so that the frame signal DATA1 has different timing skews between the clock signal CLK1 and different data segments D41 to D43. Please refer to FIG. 6 and FIG. 12. The control circuit 115 controls the routing of the selection circuits 114_2 to 114_4 through the control signals CS62 to CS64. Based on the control of the control circuit 115, the selection circuits 114_2 to 114_4 select different trigger pulse trains corresponding to different source drivers 120_1 to 120_3 from the candidate pulse trains for the parallel-to-serial converters P2S62 to P2S64 to adjust the phases of the differential signals LV21 to LV23. Therefore, the clock signal CLK1 output by the timing controller 110 has different timing skews for different data segments D41 to D43, and is adapted to different transmission path delays between the timing controller 110 and the source drivers 120_1 to 120_3.

Figure 13:
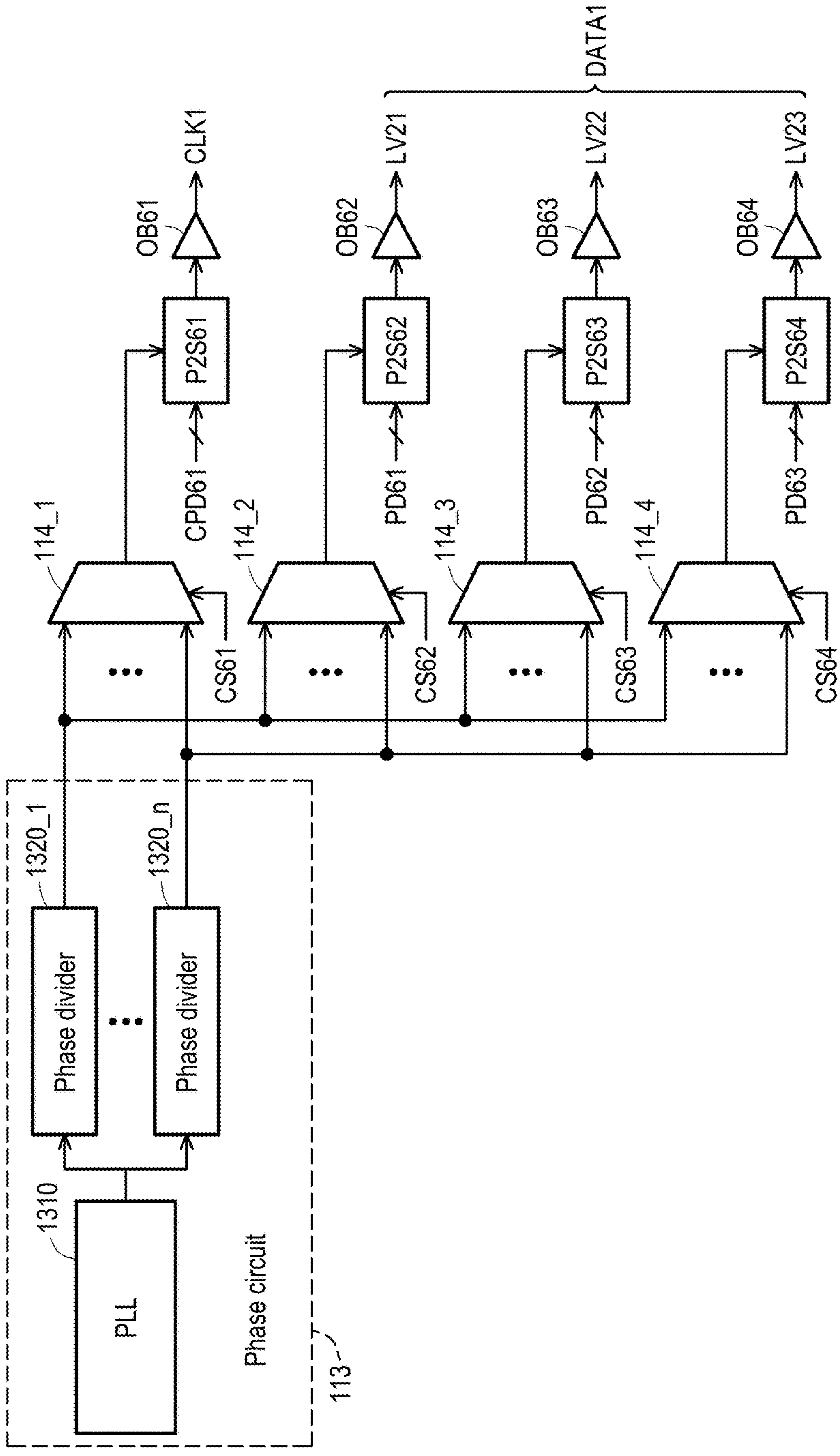
FIG. 13 is a schematic diagram of a circuit block of a phase circuit according to an embodiment of the disclosure.

FIG. 13 is a schematic diagram of a circuit block of the phase circuit 113 according to an embodiment of the disclosure. The phase circuit 113 shown in FIG. 13 can be one of many implementation examples of the timing phase circuit 113 shown in FIG. 6. The descriptions of the phase circuit 113, the selection circuit 114_1, the selection circuit 114_2, the selection circuit 114_3, the selection circuit 114_4, the parallel-to-serial converter P2S61, the parallel-to-serial converter P2S62, the parallel-to-serial converter P2S63, the parallel-to-serial converter P2S64, the output buffer OB61, the output buffer OB62, the output buffer OB63, and the output buffer OB64 shown in FIG. 13 can be referred to as those depicted in FIG. 6. In the embodiment shown in FIG. 13, the phase circuit 113 includes a phase locked loop (PLL) 1310 and a plurality of phase dividers (e.g., phase dividers 1320_1 to 1320_*n* shown in FIG. 13). The PLL 1310 generates abase pulse train. The number n of the phase dividers 1320_1 to 1320_*n* can be determined according to the actual design. The phase dividers 1320_1 to 1320_*n* are coupled to the PLL 1310 to receive the base pulse train. The phase dividers 1320_1 to 1320_*n* perform phase division on the base pulse train of the PLL 1310 to generate a plurality of candidate pulse trains with different phases to the selection circuits 114_1 to 114_4.

Figure 14:
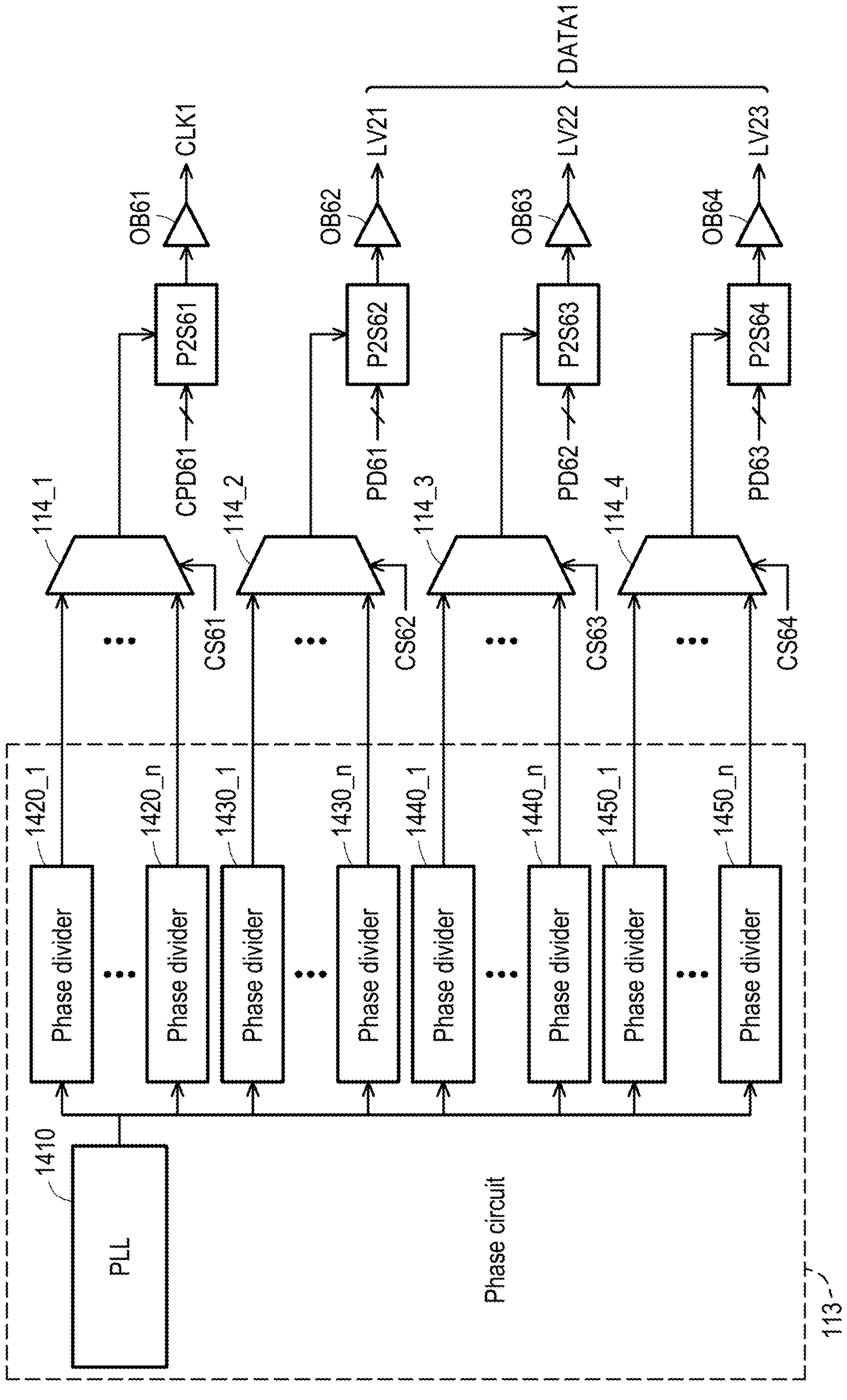
FIG. 14 is a schematic diagram of a circuit block of a phase circuit according to another embodiment of the disclosure.

FIG. 14 is a schematic diagram of a circuit block of the phase circuit 113 according to another embodiment of the disclosure. The phase circuit 113 shown in FIG. 14 can be one of many implementation examples of the timing phase circuit 113 shown in FIG. 6. The descriptions of the phase circuit 113, the selection circuit 114_1, the selection circuit 114_2, the selection circuit 114_3, the selection circuit 114_4, the parallel-to-serial converter P2S61, the parallel-to-serial converter P2S62, the parallel-to-serial converter P2S63, the parallel-to-serial converter P2S64, the output buffer OB61, the output buffer OB62, the output buffer OB63, and the output buffer OB64 shown in FIG. 14 can be referred to as those depicted in FIG. 6. In the embodiment shown in FIG. 14, the phase circuit 113 includes a PLL 1410, first phase dividers (e.g., phase dividers 1420_1 to **1420_*n* shown in FIG. 14), second phase dividers (e.g., phase dividers 1430_1 to 1430_*n* shown in FIG. 14), third phase dividers (e.g., phase dividers 1440_1 to 1440_*n* shown in FIG. 14), and fourth phase dividers (e.g., phase dividers 1450_1 to 1450_*n* shown in FIG. 14). The PLL 1410** generates a base pulse train.

The number n of the phase dividers can be determined according to the actual design. The phase dividers 1420_1 to **1420_*n*, the phase dividers 1430_1 to 1430_*n*, the phase dividers 1440_1 to 1440_*n*, and the phase dividers 1450_1 to 1450_*n* are coupled to the PLL 1410 to receive the base pulse train. The phase dividers 1420_1 to 1420_*n* perform phase division on the base pulse train of the PLL 1410 to generate a plurality of first candidate pulse trains with different phases to the selection circuit 114_1. The phase dividers 1430_1 to 1430_*n* perform phase division on the base pulse train of the PLL 1410 to generate a plurality of second candidate pulse trains with different phases to the selection circuit 114_2. The phase dividers 1440_1 to 1440_*n* perform phase division on the base pulse train of the PLL 1410 to generate a plurality of third candidate pulse trains with different phases to the selection circuit 114_3. The phase dividers 1450_1 to 1450_*n* perform phase division on the base pulse train of the PLL 1410 to generate a plurality of fourth candidate pulse trains with different phases to the selection circuit 114_4**.

To sum up, the transmitter (e.g., the timing controller 110) provided in one or more of the above-mentioned embodiments in the multi-drop architecture (e.g., the mini-LVDS interface) adjusts the timing skew relationship between the clock signal CLK1 and the frame signal DATA1 for different receivers (e.g., the source drivers 120_1 to 120_3) by stopping the clock, ensuring that when each receiver receives data, the positive and negative edges of the clock maintain a consistent corresponding order relationship with the data (the frame signal DATA1). Such an adjustment allows each receiver to obtain the optimal setup/hold time eye pattern, thereby overcoming potential reception issues that may occur during high-speed transmission.

Besides, in addition to toggling different timing skews according to different receivers, in one or more of the above-mentioned embodiments, the functions of adjusting different analog characteristics of transmitter signals (e.g., the signal slew rate, the signal swing, the signal pre-emphasis, etc.) are also achieved. In one or more of the above-mentioned embodiments, the distribution of signal strength can be dispersed, thereby reducing the EMI energy. Moreover, adjusting the swing of shorter paths in one or more of the above-mentioned embodiments can also reduce power consumption, providing an advantage of reduced power.

Moreover, in one or more of the above-mentioned embodiments, high-speed transmission issues can be overcome when the existing general source drivers are used. If paired with corresponding source drivers, a golden key can be defined in the transmission content and a hand shake mechanism can be established between both parties, allowing automatic adjustment to determine the optimal clock skew for each source driver, thereby increasing application convenience.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A timing controller, comprising:

a timing signal generation part, generating a clock signal to a plurality of source drivers for driving a display panel; and a frame signal generation part, generating a frame signal synchronized with the clock signal, wherein the frame signal comprises a plurality of data segments corresponding to different source drivers of the source drivers, and the timing controller adjusts a phase of at least one of the clock signal and the frame signal, so that the clock signal has different timing skews for different data segments of the data segments and is adapted to different transmission path delays between the timing controller and the source drivers.

2. The timing controller according to claim 1, wherein the timing controller transmits the clock signal and the frame signal to the source drivers through a mini low-voltage differential signaling interface.

3. The timing controller according to claim 1, wherein the data segments comprise a first data segment and a second data segment, the timing controller has a stop period between a period of outputting the first data segment a the period of outputting the second data segment, the timing controller stops toggling the clock signal during the stop period, and the timing controller sets signal characteristics of at least one of the clock signal and the frame signal based on at least one signal characteristic parameter during the stop period.

4. The timing controller according to claim 3, wherein the at least one signal characteristic parameter comprises at least one of a phase, a slew rate, a swing, and a pre-emphasis.

5. The timing controller according to claim 3, further comprising:

a line buffer;

a write control circuit, coupled to the line buffer, wherein the write control circuit receives the first data segment and the second data segment from a data source and writes the first data segment and the second data segment into the line buffer; and a read control circuit, coupled to the line buffer, wherein the read control circuit reads out the first data segment from the line buffer to the frame signal generation part during a first period, the read control circuit stops reading out any data segment from the line buffer during the stop period after the first period, and the read control circuit reads out the second data segment from the line buffer to the frame signal generation part during a second period after the stop period.

6. The timing controller according to claim 5, further comprising:

a logic circuit, controlled by the read control circuit, wherein, in response to the read control circuit reading out the first data segment from the line buffer to the frame signal generation part during the first period, the logic circuit outputs CLK pattern data to the timing signal generation part to generate the clock signal;

in response to the read control circuit stopping reading out any data segment from the line buffer during the stop period, the logic circuit stops outputting the CLK pattern data to the timing signal generation part to stop generating the clock signal; and in response to the read control circuit reading out the second data segment from the line buffer to the frame signal generation part during the second period, the logic circuit outputs the CLK pattern data to the timing signal generation part to resume generating the clock signal.

7. The timing controller according to claim 5, further comprising:

a parameter register, coupled to the read control circuit, wherein the read control circuit writes the at least one signal characteristic parameter into the parameter register; and an output control circuit, coupled to the parameter register, wherein the output control circuit controls at least one of the timing signal generation part and the frame signal generation part based on the at least one signal characteristic parameter in the parameter register, so as to set the signal characteristics of the at least one of the clock signal and the frame signal.

8. The timing controller according to claim 1, wherein the data segments comprise a first data segment and a second data segment, the clock signal comprises a first clock segment corresponding to the first data segment and a second clock segment corresponding to the second data segment, the timing controller adjusts a phase of the first clock segment to a first phase, and the timing controller adjusts a phase of the second clock segment to a second phase different from the first phase, so that the clock signal has different timing skews for different data segments of the data segments.

9. The timing controller according to claim 1, wherein the data segments comprise a first data segment and a second data segment, the timing controller adjusts a phase of the first data segment to a first phase, and the timing controller adjusts a phase of the second data segment to a second phase different from the first phase, so that the clock signal has different timing skews for different data segments of the data segments.

10. The timing controller according to claim 1, wherein the timing signal generation part comprises:

a parallel-to-serial converter, converting CLK pattern data into the clock signal based on a trigger pulse train; and an output buffer, having an input terminal coupled to an output terminal of the parallel-to-serial converter, wherein the output buffer outputs the clock signal to the source drivers.

11. The timing controller according to claim 1, wherein the frame signal generation part comprises:

a parallel-to-serial converter, converting parallel data corresponding to the frame signal into the frame signal based on a trigger pulse train; and an output buffer, having an input terminal coupled to an output terminal of the parallel-to-serial converter, wherein the output buffer outputs the frame signal to the source drivers.

12. The timing controller according to claim 1, further comprising:

a phase circuit, generating a plurality of candidate pulse trains with different phases;

a first selection circuit, coupled to the phase circuit to receive the candidate pulse trains, wherein the first selection circuit selects one of the candidate pulse trains as a first trigger pulse train for the timing signal generation part, so as to adjust the phase of the clock signal; and a second selection circuit, coupled to the phase circuit to receive the candidate pulse trains, wherein the second selection circuit selects one of the candidate pulse trains as a second trigger pulse train for the frame signal generation part, so as to adjust the phase of the frame signal.

13. The timing controller according to claim 12, wherein the phase circuit comprises:

a phase locked loop, generating a base pulse train; and a plurality of phase dividers, coupled to the phase locked loop to receive the base pulse train, wherein the phase dividers perform a phase division on the base pulse train to generate the candidate pulse trains with different phases for the first selection circuit and the second selection circuit.

14. The timing controller according to claim 1, further comprising:

a phase locked loop, generating a base pulse train;

a first phase divider, coupled to the phase locked loop to receive the base pulse train, wherein the first phase divider performs a phase division on the base pulse train to generate a plurality of first candidate pulse trains with different phases;

a first selection circuit, coupled to the first phase divider to receive the first candidate pulse trains, wherein the first selection circuit selects one of the first candidate pulse trains as a first trigger pulse train for the timing signal generation part, so as to adjust the phase of the clock signal;

a second phase divider, coupled to the phase locked loop to receive the base pulse train, wherein the second phase divider performs a phase division on the base pulse train to generate a plurality of second candidate pulse trains with different phases; and a second selection circuit, coupled to the second phase divider to receive the second candidate pulse trains, wherein the second selection circuit selects one of the second candidate pulse trains as a second trigger pulse train for the frame signal generation part, so as to adjust the phase of the frame signal.

15. An operation method of a timing controller, comprising:

generating, by the timing controller, a clock signal to a plurality of source drivers for driving a display panel;

generating, by the timing controller, a frame signal synchronized with the clock signal, wherein the frame signal comprises a plurality of data segments corresponding to different source drivers of the source drivers; and adjusting a phase of at least one of the clock signal and the frame signal, so that the clock signal has different timing skews for different data segments of the data segments and is adapted to different transmission path delays between the timing controller and the source drivers.

16. The operation method according to claim 15, further comprising:

transmitting, by the timing controller, the clock signal and the frame signal to the source drivers through a mini low-voltage differential signaling interface.

17. The operation method according to claim 15, wherein the data segments comprise a first data segment and a second data segment, the timing controller has a stop period between a period of outputting the first data segment and a period of outputting the second data segment, and the operation method further comprises:

stopping toggling the clock signal during the stop period; and setting signal characteristics of at least one of the clock signal and the frame signal based on at least one signal characteristic parameter during the stop period.

18. The operation method according to claim 17, wherein the at least one signal characteristic parameter comprises at least one of a phase, a slew rate, a swing, and a pre-emphasis.

19. The operation method according to claim 17, further comprising:

receiving, by a write control circuit of the timing controller, the first data segment and the second data segment from a data source;

writing the first data segment and the second data segment into a line buffer of the timing controller;

reading out, by a read control circuit of the timing controller, the first data segment from the line buffer to a frame signal generation part of the timing controller during a first period;

stopping, by the read control circuit, reading out any data segment from the line buffer during the stop period after the first period; and reading out, by the read control circuit, the second data segment from the line buffer to the frame signal generation part of the timing controller during a second period after the stop period.

20. The operation method according to claim 19, further comprising:

in response to reading out the first data segment from the line buffer to the frame signal generation part during the first period by the read control circuit, outputting, by a logic circuit of the timing controller, CLK pattern data to a timing signal generation part to generate the clock signal;

in response to stopping reading out any data segment from the line buffer during the stop period by the read control circuit, stopping, by the logic circuit, outputting the CLK pattern data to the timing signal generation part to stop generating the clock signal; and in response to reading out the second data segment from the line buffer to the frame signal generation part during the second period by the read control circuit, outputting, by the logic circuit, the CLK pattern data to the timing signal generation part to resume generating the clock signal.

21. The operation method according to claim 19, further comprising:

writing, by the read control circuit, the at least one signal characteristic parameter into a parameter register of the timing controller; and controlling, by an output control circuit of the timing controller, at least one of the timing signal generation part and the frame signal generation part based on the at least one signal characteristic parameter in the parameter register, so as to set the signal characteristics of the at least one of the clock signal and the frame signal.

22. The operation method according to claim 15, wherein the data segments comprise a first data segment and a second data segment, the clock signal comprises a first clock segment corresponding to the first data segment and a second clock segment corresponding to the second data segment, and the operation method further comprises:

adjusting a phase of the first clock segment to a first phase; and adjusting a phase of the second clock segment to a second phase different from the first phase, so that the clock signal has different timing skews for different data segments of the data segments.

23. The operation method according to claim 15, wherein the data segments comprise a first data segment and a second data segment, and the operation method further comprises:

adjusting a phase of the first data segment to a first phase; and adjusting a phase of the second data segment to a second phase different from the first phase, so that the clock signal has different timing skews for different data segments of the data segments.

* * * * *